Aug. 2, 1966     D. M. JACOB     3,264,644
UNAMBIGUOUS RANGE RADAR SYSTEM
Filed Dec. 31, 1962     5 Sheets-Sheet 1

DON M. JACOB
INVENTOR.

BY
AGENT

Aug. 2, 1966

D. M. JACOB 3,264,644

UNAMBIGUOUS RANGE RADAR SYSTEM

Filed Dec. 31, 1962

DON M. JACOB
INVENTOR.

BY
AGENT

DON M. JACOB
INVENTOR.

BY

AGENT

United States Patent Office 3,264,644
Patented August 2, 1966

3,264,644
UNAMBIGUOUS RANGE RADAR SYSTEM
Don M. Jacob, Los Angeles, Calif., assignor, by mesne assignments, to TRW Inc., a corporation of Ohio
Filed Dec. 31, 1962, Ser. No. 248,680
18 Claims. (Cl. 343—12)

This invention relates generally to a cooperative system employing a continuous wave (CW) radar and a transponder and, particularly, to a system for docking two objects together. This invention is an improvement of copending application, Serial No. 248,357, filed December 31, 1962, and assigned to the same common assignee.

The disclosed system is particularly adaptable for use in outer space due to the light weight, high accuracy, low power requirements, and lack of moving parts. These same features also make the invention desirable for earthbound activities, such as aircraft detection, aircraft landing systems, and in other nonrelated fields as long range surveying. This invention increases the effective range of the copending application and teaches how to remove range ambiguities in the received signal.

The preferred embodiment is described in connection with an X-band radar located on a first object and having means for high accuracy tracking of a cooperative transponder at very long and very short ranges. The transponder may be located on a second object, such as another moving vehicle, or emplaced on a substantially fixed object such as the moon or another planet. Both the radar and the beacon make use of the injected reference technique that is more fully described and claimed in copending application, Serial No. 237,229, filed November 13, 1962, and assigned to the same common assignee. The injected reference technique has distinct advantages for high ranging accuracy and great system flexibility, since the injected reference signal allows a high degree of stability in a phase tracking receiver and circumvents the "zero-set" problem which arises because of drifts in receiver delay time with variations in temperature and signal strength.

The basic idea of the injected reference system is to track an incoming signal by injecting, prior to any RF filtering, an RF signal derived from tracking oscillators. The incoming signal consists of a carrier and a ranging sideband. It is tracked by injecting an identical signal maintained at a displacement of approximately 38 kc. relative to the incoming signal. An offset frequency of 38 kc. was used on the 400 mc. receiver described in the copending application. The offset frequencies for the preferred X-band radar system are 32 kc. for the transponder and 38 kc. for the radar. The injected reference and incoming signals are reduced to an intermediate frequency (IF) more suitable for amplification by present-day, solid-state devices by means of a separate stable local oscillator (STALO) in both the radar and the transponder.

The carrier and sideband signals are separated by filtering at the lower intermediate frequencies and individually tracked in separate channels. A detector on the output of each channel IF amplifier detects the frequency offset between the carrier or sideband being tracked and the associated injected reference. Consequently, the channel IF amplifier detector actually serves the purpose of a mixer; and the injected reference serves as local oscillator power in the second mixer. The resulting signal is filtered and applied to a limiter amplifier which provides most of the receiver gain. The output of the limiter amplifier is phase detected in both the carrier and subcarrier channels against a common reference oscillator which establishes the frequency offset of the injected reference signal.

The output of the phase detector in the carrier channel is applied to a voltage-controlled oscillator (VCO) through an appropriate compensation network and amplifier. The output of the carrier VCO after frequency multiplication becomes the carrier injected reference. The signal from the phase detector of the sideband channel is used similarly to control a VCO in the transponder which runs at the range modulation frequency. The output of this VCO is used to modulate the injected reference carrier to generate the injected reference sideband.

The phase stable feature of the tracking receiver consists of establishing the phase information on the offset frequency of approximately 38 kc. prior to passage through filters filters and amplifiers. Secondly, the injected reference signal in the IF amplifiers establishes the operating power level in the IF amplifiers so that the power level in the IF is essentially constant for the dynamic range of incoming signals. Since the phase reference is established at the offset frequency of approximately 38 kc., a time delay which would cause a phase shift of 105 degrees in the 4 mc. modulation (the modulation frequency employed in this radar) now causes only one degree phase shift. In the basic radar configuration the 4 mc. modulation signal is detected and the phase is compared with the phase of the 4 mc. modulation signal applied to the transmitted carrier signal. A comparison between the received 4 mc. signal and the transmitted 4 mc. signal provides an output indication of the range between the radar and the transponder. Since the 4 mc. wavelength of the 4 mc. modulation signal is equal to 123 feet, the defined phase difference will represent fine range information unambiguous from zero to 123 feet. In the present invention, coarse range is obtained by sweeping the same subcarrier over a known frequency range, measuring the subcarrier phase shift over a time interval encompassing the sweep, and comparing this phase shift against that predicted for the unswept subcarrier on the basis of a carrier Doppler measurement. The sweep range is equivalent to a lower frequency subcarrier which resolves the fine range ambiguity. Thus, only two phase measurments are required: (1) subcarrier phase and (2) carrier phase. Coarse range is determined from a comparison of the two measuements in conjunction with information about the subcarrier frequency modulation.

The range and range rate determination may be described analytically as follows:

Let $\phi_m$ and $\phi_c$ be the two phase measurements performed by the radar receiver.

$$\phi_m = \omega_m \tau$$
$$\phi_c = \omega_b t + \omega_c \tau \tag{1}$$

where $\omega_m$ = subcarrier frequency, radian/sec.
$\omega_c$ = carrier frequency, radian/sec.
$\omega_b$ = a bias frequency on which the carrier Doppler information is recovered
$\tau$ = round trip delay ($2R/c$)
$R$ = range
$c$ = velocity of propagation The range rate is obtained by means of a cycle count of the waveform, the phase of which is given by $\phi_c$ over a time interval ($t_a$, $t_b$).

$$\dot{R} \approx \frac{R_b - R_a}{t_b - t_a} = \frac{\Delta R}{\Delta t} = \frac{c}{4\pi f_c}\left(\frac{\Delta \phi_c}{\Delta t}\right) - \omega_b \tag{2}$$

Fine range is given by $$r + R = n\lambda_m \tag{3}$$

where $n$ is the number of whole wavelengths of the modulation encompassed in range R.

$$\phi_m = \omega_m \tau$$
$$= \frac{2\omega_m}{c} R = \frac{2\omega_m}{c}(r + n\lambda_m)$$
$$= 4\pi\left(\frac{r}{\lambda_m} + n\right) \quad (4)$$

so that $$r = \frac{\lambda_m \phi_m}{4\pi} - n\lambda_m \quad (5)$$

In order to examine coarse ranging, a time interval is considered in which the frequency of the modulation is swept linearly from $f_0$ to $f_0 + \Delta f$ and back to $f_0$. The change in $\phi_m$ between some arbitrary time, $t_0$, prior to initiation of sweep and a time $t$ after the sweep transient has terminated is considered:

$$\phi_m(t_0) = \frac{4\pi}{c} f_0 R_0$$
$$\phi_m(t) = \frac{4\pi}{c}(f_0 + \Delta f)(R_0 + \Delta R) \quad (6)$$
$$\Delta\phi_m = \frac{4\pi}{c} f_0 \Delta R + \frac{4\pi}{c} R \Delta f$$

where
$$R = R_0 + \Delta R = R(t) \quad (7)$$

Rearranging (7) yields $$R = \frac{c}{4\pi \Delta f} \Delta\phi_m - \frac{f_0}{\Delta f} \Delta R \quad (8)$$

but $\Delta R$ is available in terms of the carrier phase change.

$$\Delta\phi_c = \frac{4\pi f_c}{c} \Delta R \quad (9)$$

Thus $$R = \frac{c}{4\pi \Delta f} \Delta\phi_m - \frac{cf_0}{4\pi \Delta f f_c} \Delta\phi_c \quad (10)$$

or $$R = \frac{c\left[\Delta\phi_m - \Delta\phi_x \frac{F_1}{F_{xb}}\right]}{4\pi[F_2 - F_1]} \quad (11)$$

The measurements may be taken over a sweep in either direction and the range determination is in no way dependent on the manner in which range varies during the measurement interval. Some advantage may be taken of a prior knowledge that range rate is closing by making measurements only during the sweep down. This eliminates a possible ambiguity when $|f_0 \Delta R|$ exceeds $|R \Delta f|$.

The transponder is a simplified version of the basic radar configuration since the peripheral acquisition and data extraction circuitry are eliminated. The transponder performs modulation phase tracking of the received carrier and subcarrier signals; and aside from the basic transmitter, modulator, and tracking loops, the only peripheral circuitry required is for a carrier lock-on detection circuit. The carrier fequency transmitted by the transponder is different from the carrie frequency transmitted by the radar to eliminate ambiguities in transmitting and receiving informaton.

Further objects and advantages will be made more apparent by referring now to the accompanying drawings wherein.

The invention is concerned with a complete solid-state, cooperative radar system operating at X-band that is particularly useful for space rendezvousing and docking. The use of solid-state techniques leads to a most reliable system having low weight and low power consumption. No moving parts are required in the system, and simplicity is achieved by combining all required functions into a single X-band radar. While described for X-band, the system is quite adaptable to any transmitted frequency.

The described system exhibits an extremely high accuracy range readout (in the order of a foot) that has no minimum range limitation. Fine range data resolution is obtained by measuring the phase of a 4 mc. subcarrier that is sent to a transponder and coherently transmitted back to the radar. The 4 mc. phase stability is achieved by phase stabilization techniques in which the carrier and subcarrier signals are tracked along with an injected reference in separate narrowband receivers, as described and claimed in the reference copending application, Serial No. 237,229. Incremental range may be obtained by integrating the carrier X-band Doppler frequency between fine range readout points and resolving the ambiguity of the fine range by sweeping the 4 mc. modulation over approximately 150 kc. and monitoring the phase variation between outgoing and returning 4 mc. signals while at the same time keeping track of the X-band Doppler cycles. The 4 mc. subcarrier in the present invention is obtained by modulating, preferably amplitude modulating, the transmitted signal with a 4 mc. modulation signal.

Angle tracking is achieved by employing an interferometer principle which essentially keeps track of the phase variation of an incoming signal between three receiving antennas located at right angle to each other. A phase difference in the received carrier signal at the three antennas provides the necessary angle tracking information.

Figure 1:
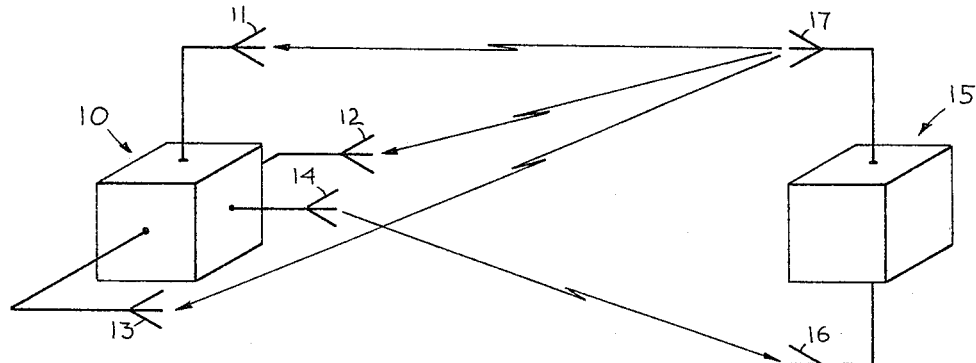
FIG. 1 is a block diagram illustrating the basic implementation and rendezvousing and/or docking a first object having radar with a second object having a transponder.

Referring now to FIG. 1, there is shown a first object 10 containing a radar having three receiving antennas 11, 12, and 13, and a transmitting atennna 14. The three antennas 11, 12, and 13 are connected in circuit as an interferometer to measure the phase difference of the received carrier signal appearing at each antenna. A second object 15 contains a transponder for receiving and coherently transmitting a signal by means of a receiving antenna 16 and a transmitting antenna 17. In operation the first object 10 transmits a continuous wave (CW) signal from antenna 14 to the second object 15, which receives the signal by antenna 16. The second object 15 coherently transmits a signal from antenna 17 back to the first object 10 with a frequency that is phase coherent with the signal it received.

Figure 2:
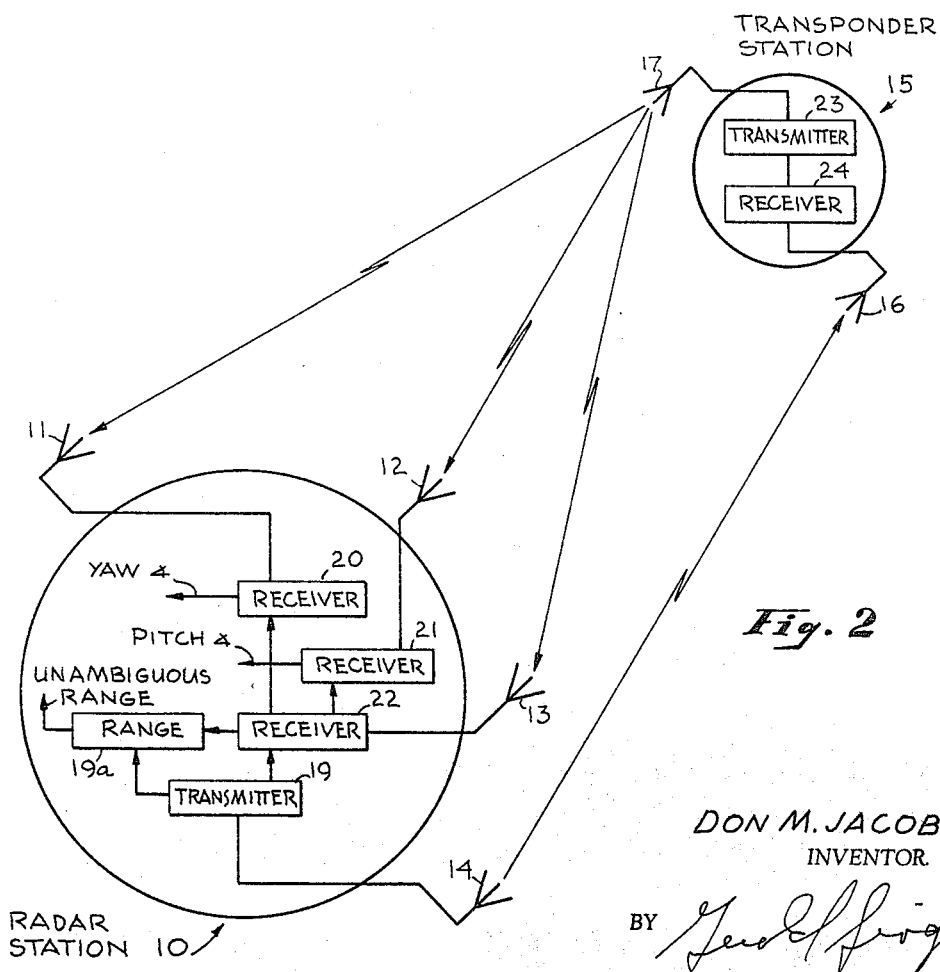
FIG. 2 illustrates the components comprising the radar station and the transponder of FIG. 1.

Referring now to FIG. 2, there is shown a block diagram of the first object 10, comprising a continuous wave Doppler transmitter 19 and a plurality of receivers 20, 21, and 22. Also included is a range ambiguity resolving circuit 19a. The continuous wave Doppler transmitter 19 is arranged to transmit a CW signal to the transponder in the second moving object 15. The transponder may be located in a satellite, missile, or simply parachuted to ground and used as a homing beacon. The transponder comprises a transmitter 23 and a receiver 24 for transmitting a carrier signal from antenna 17 that is phase coherent with the received signal at antenna 16. Antennas 11, 12, 13 are adapted to receive the carrier signal from the transponder. Receivers 20, 21, and 22 measure the phase difference at the antennas to determine relative angle information. The modulation signal applied to the carrier signal for generating the subcarrier is also applied to one of the receivers 22 in order to obtain range information. The phase change in the carrier signal measured by the receivers 20, 21, and 22 indicates the relative movement between the first object 10 and the second object 15. The three receivers in this configuration are known as an interferometer and by themselves will produce yaw and pitch bearing angle information. The combination of the transmitter 19 with any of the receivers will produce fine ranging information which, together with the range difference or angle information from the three receivers connected as an interferometer, will be sufficient to track an object in space.

In the preferred embodiment, the carrier signal is an X-band signal of approximately 10,000 mc. that is modulated by a 4 mc. signal for producing a subcarrier (sideband) having a frequency of the X-band carrier plus the 4 mc. modulation signal. Ranging information is obtained from the 4 mc. subcarrier signal which is used to modulate the X-band carrier. One wavelength of the 4 mc. signal is approximately 123 feet, thereby allowing an unambiguous ranging from zero to 123 feet. According to the principles described in this invention, the 4 mc. modultion signal is swept in frequency a given amount, such as 150 kc., while the change in the number of 4 mc. modulation cycles between the outgoing and returning signals is recorded. The number of X-band round trip cycles is also monitored. These two cycle counts with a knowledge of the frequencies at the beginning and at the end of a sweep and the knowledge of the X-band frequency are all the information necessary to compute range in a digital computer. The accuracy of the coarse range determination will not be a function of the manner of sweeping the modulation frequency and will not be a function of any fixed, i.e., long term, phase error obtained in the 4 mc. signal. In the first embodiment illustrated in FIG. 3, use is made of the digital computer together with the Doppler shift on the X-band signal. As mentioned before, it is necessary to use the X-band Doppler in the range computation, and it does permit simple data extraction for computer applications.

Figure 3:
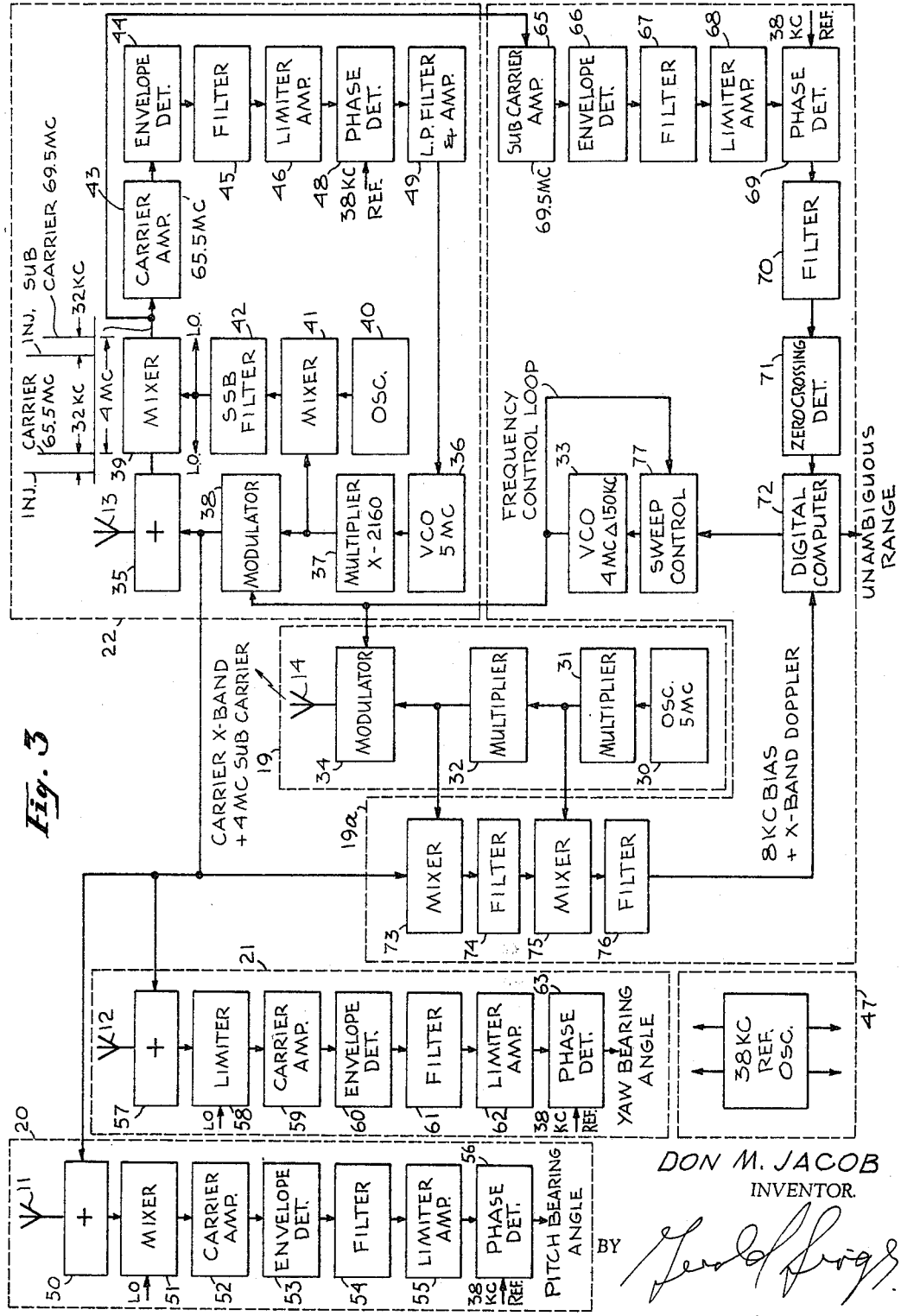
FIG. 3 is a block diagram of the complete radar station, which illustrates a first embodiment of the invention for eliminating range ambiguity.

Referring now to FIG 3, there is shown a complete radar system illustrating the transmitter, the receivers, and the first embodiment of the range ambiguity resolving circuits. The transmitted carrier signal in the radar is generated at approximately 5 mc. by means of an oscillator 30 and multiplied in a series of multipliers 31 and 32 a total of 2304 times up to X-band for transmission from antenna 14. The subcarrier is generated by a substantially 4 mc. modulation signal generated in a VCO 33 that modulates the X-band carrier signal in a modulator 34. The transmitted carrier and subcarrier signals are transmitted to the transponder which receives and transmits a carrier and subcarrier signal that is phase coherent with the signals it received. These signals are received by antennas 11, 12, and 13. The received signals arriving at antenna 13 are added to locally generated injected reference signals in an adder 35. The carrier injected reference signal is offset from the received carrier signal by 38 kc. and is designed to track the received carrier signal. The carrier injected reference signal is generated in a VCO 36 at approximately 5 mc. and suitably multiplied to the desired X-band frequency in a varactor multiplier 37. The carrier injected reference signal is modulated in a modulator 38 by the same 4 mc. signal generated in the VCO 33 used to modulate the transmitted carrier signal. The purpose of this additional modulation on the carrier injected reference signal is to generate a subcarrier injected reference signal that is used in connection with the ranging circuit. The output of the adder 35 will, therefore, consist of at least the received X-band carrier signal, the subcarrier signal, and the injected reference signals, which are each 38 kc. removed from the carrier signal and the subcarrier signal, respectively. Since present-day transistorized circuits cannot satisfactorily operate at an X-band frequency, a suitable low frequency oscillator and multiplying circuits are used to generate a local oscillator signal which is mixed with the received signals from the adder 35 in a mixer 39 to thereby produce representative signals at frequencies that are more easily amplified and controlled by present-day, solid-state devices. For example, in the preferred embodiment the local oscillator frequencies are chosen so as to reduce the received X-band carrier signal to 65.5 mc. The local oscillator signal is obtained basically from an oscillator 40 which is operated at a convenient frequency of 65.5 mc. The output of the oscillator 40 is mixed with the output of the multiplier 37, which is locked to the received carrier signal but offset by 38 kc. to produce a signal at the X-band frequency which is ±65.5 mc. Since only the low frequency side of the mixed signal is used, the output of the mixer 41 is fed to a suitable single sideband filter 42 which filters out the high side and feeds the resultant signal to the mixer 39. The output of the single sideband filter 42 is actually the local oscillator signal for all three receivers, namely, 20, 21, and 22. Mixer 39 subtracts the local oscillator signal from all signals fed from the adder 35. The output of the mixer 39 is fed to a carrier amplifier 43, arranged to pass 65.5 mc. and have a one mc. bandpass. Since the received carrier signal is reduced to 65.5 mc. and the subcarrier to 69.5 mc., the carrier signal and the carrier injected reference signal are amplified and passed while the subcarrier signal and the subcarrier injected reference signal are blocked. The output of the carrier amplifier 43 is fed to an envelope detector 44, which detects the difference signal of 38 kc. and feeds this detected signal to a filter 45, which removes the high frequency components. The filtered 38 kc. signal from the filter 45 is fed to a limiter amplifier 46, which produces a substantially square wave of constant amplitude at the repetition rate of 38 kc. The phase of the 38 kc. detected signal from the limiter amplifier 46 is compared with the phase of a 38 kc. reference signal generated by a 38 kc. reference oscillator 47 in a phase detector 48. A phase difference between the reference 38 kc. signal and the detected 38 kc. signal is fed to a low pass filter and amplifier 49, which generates a D.C. signal having an amplitude and sign dependent on the amount of change and direction of change between the two signals. The D.C. signal generated is used to control the 5 mc. signal from the VCO 36.

A review of the phase-locked carrier loop circuit just described will show that the VCO 36 is controlled by the 38 kc. detected signal, which contains the phase information on the incoming carrier signal. Considering the carrier and a single sideband in the signal received at the antenna, which have phases $(\omega_c t + \theta)$ and $$[(\omega_c + \omega_m)t + (\theta + \phi)]$$

respectively, the signals are immediately added linearly to a similar pair in a directional coupler. This similar pair constitutes the carrier and sideband injected references shifted in phase from their counterparts on the antenna by $(\omega_r t + \phi_r)$ and $(\omega_r t + \phi_r + \phi_m)$, respectively, where $\omega_r$ is an audio frequency offset established by a reference oscillator, $\phi_m$ represents the difference between transmitted and received modulation phase. The carrier and its injected reference (as well as the sideband and its injected reference) incur nearly identical phase shifts in the receiver, since $\omega_r$ is small relative to the IF bandwidth (32 kc. in the transponder and 38 kc. in the radar). Furthermore, the information of interest is $$\phi_m = \{[(\omega_c + \omega_m)t + (\theta + \phi)] \\ - [(\omega_o + \omega_m - \omega_r)t + (\theta + \phi - \phi_m - \phi_r)]\} \\ - \{(\omega_o t + \theta) - [(\omega_o - \omega_r)t + (\theta - \phi_r)]\} \quad (12)$$

Letting $\Delta\theta_1$ and $\Delta\phi_1$ be the receiver induced phase errors on the carrier and its injected reference and $\Delta\theta_2$ and $\Delta\phi_2$ the corresponding sideband injected reference pair phase errors, the error in $\phi_m$ will be $$\epsilon_{\phi_m} = (\Delta\theta_2 - \Delta\phi_2) - (\Delta\theta_1 - \Delta\phi_1) \qquad (13)$$

By choosing $\omega_r$ small compared to the IF bandwidths and by approximately matching IF phase characteristic slopes at carrier and sideband frequencies, receiver phase errors due to IF phase characteristic variation are virtually eliminated. The modulation phase shift, $\phi_m$, is recovered by isolating carrier injected reference and sideband injected reference pairs by IF filtering, envelope detecting in each channel, and phase comparing of the two outputs. The detector outputs are audio signals at the injected reference offset frequency, $\omega_r$, which may be regarded as a second intermediate frequency. Amplification and filtering of these signals are required before phase comparison. The amplification is provided in limiter amplifiers, and the filtering takes place in relatively phase stable audio frequency filters.

An auxiliary feature of the injected reference technique is that the receiver through the second detector behaves as a wide dynamic range linear receiver, although none of its components is subjected to a wide dynamic range signal. The requirement for linearity is that the injected reference signal level be fixed and significantly greater than that of the received signal. Thus the signal level in the receiver is set by the injected reference and is essentially constant. Hence, a signal generated by the VCO 36 will continuously track the carrier signal while maintaining the 38 kc. offset. The phase-locked carrier loop circuit in receiver 22 is used as a standard for determining the phase difference in the X-band signal received by antennas 11 and 12. Both receivers 20 and 21 are identical in operation in that a comparison is made between the received signals against the phase of the carrier phase-locked loop described in connection with receiver 22. For example, in receiver 20 the carrier signal is received by antenna 11, which is fed to an adder 50, which adds the received carrier signal with the same injected reference signal generated in the carrier phase-locked loop of receiver 22. The output of adder 50 is fed to a mixer 51, which uses the same local oscillator signal fed to mixer 39 and described in connection with receiver 22. The operation of mixer 51 is the same as mixer 39 in that the frequency of the carrier signal is reduced to 65.5 mc. and fed to a carrier amplifier 52, arranged to pass a signal 65.5 mc. with a bandwidth of one mc., similar in nature to carrier amplifier 43. The amplified signal from carrier amplifier 52 is detected in an envelope detector 53, which is arranged to detect the 38 kc. difference signal between the carrier signal and the injected reference signal. The detected 38 kc. signal is filtered in a filter 54 and fed to a limiter amplifier 55, which generates a substantially square wave of constant amplitude at a frequency of 38 kc. The detected 38 kc. signal is continuously compared with the same 38 kc. reference signal generated in oscillator 47, in a phase detector 56. The output signal from phase detector 56 will, therefore, represent the phase difference between the signal received by antenna 11 as compared with the carrier signal received by antenna 13 of receiver 22. Depending on the physical location of the antenna 11, the output signal may be identified as a pitch bearing angle signal.

Receiver 21 is identical to receiver 20 just described. The carrier signal received by antenna 12 is similarly fed to an adder 57, which adds the carrier signal to the same injected reference signal generated in receiver 22 and used in receiver 20. The output of adder 57 is mixed with the same local oscillator signal generated in receiver 22 and used in receiver 20 with a mixer 58, the output of which is amplified in a carrier amplifier 59, arranged to have the same passband characteristics as carrier amplifiers 43 and 52. The carrier amplifier 59 feeds an envelope detector 60 which detects the 38 kc. difference signal and feeds the output to a filter 61. The output of filter 61 is fed to a limiter amplifier 62 for generating a substantially square wave of constant amplitude at a 38 kc. rate. The detected 38 kc. signal is continuously phase compared against the same reference 38 kc. signals generated by oscillator 47 in a phase detector 63. The output of the phase detector 63 will, therefore, comprise information representing the phase difference between the carrier signal received by antenna 12 as compared with the carrier signal received by antenna 13; and depending again on the physical location of the antenna 12, the output signal may be identified as the yaw bearing angle signal.

The ranging information is obtained substantially from the 4 mc. subcarrier, which is transmitted to the transponder and coherently retransmitted back to the radar station. As mentioned previously, the 4 mc. signal generated by the VCO 33 also modulates the injected reference signal in modulator 38 in order to produce a subcarrier injected reference signal. Since the carrier amplifiers in receivers 20, 21, and 22 have a one mc. bandwidth limitation and are tuned to 65.5 mc., the subcarrier signal at 69.5 mc. and the subcarrier injected reference are blocked. The subcarrier signal and the subcarrier injected reference signal obtained from the output of mixer 39 in receiver 22 feed a subcarrier amplifier 65 having a bandwidth of one mc. and tuned to a frequency of 69.5 mc. The effect of the subcarrier amplifier 65 is to effectively pass the subcarrier signal and the subcarrier injected reference signal while at the same time rejecting the carrier signal. The output of the subcarrier amplifier 65 is fed to an envelope detector 66 which detects the 38 kc. difference frequency. The detected 38 kc. signal is filtered in a filter 67 which removes the high frequency components and then is fed to a limiter amplifier 68, which generates a substantially square wave at a repetition rate of 38 kc. at a substantially constant amplitude. The output of the limiter amplifier 68 is phase compared with the 38 kc. reference signal generated by oscillator 47 in a phase detector 69 which generates an output in response to a phase difference between the reference 38 kc. signal and the detected 38 kc. signal in a similar manner as the referred to phase detectors in receivers 20, 21, and 22. Since the wavelength of the 4 mc. signal can be shown to be equal to 123 feet, the output of the phase detector 69 will accurately indicate the phase change of the 4 mc. signal between that transmitted and that received, which information is representative of fine range between the first and second object from zero to 123 feet. In the present invention, the range ambiguity involving multiples of the 4 mc. modulation frequency is resolved by sweeping the modulation signal generated by the VCO 33 and counting the number of 4 mc. wavelengths or 360 degree zero crossing received during the sweeping process. The output of the phase detector 69 will generally be a trapezoidal waveform, since the output of the limiter amplifier 68 is a square wave; and the reference signal generated by the reference oscillator 47 is preferably a square wave. The exact shape of the input signals to the phase detector 69 is unimportant; however, it is important that a varying signal be obtained from the output of the phase detector 69 since the additional circuitry to be described will detect the zero crossing of the output signal. The output of the phase detector 69 will indicate Doppler information of modulation frequency and, hence, of low frequency. The phase detector 69 feeds a filter 70 to remove the high frequencies, which, in the preferred embodiment, was arranged to pass approximately zero to 50 cycles. The output of the filter 70 is fed to a zero crossing detector 71 such as a Schmidt trigger which detects the zero crossing of the filtered signal from filter 70 and generates a positive going output signal for each 360 degree phase change of the input signal. The output of the zero crossing detector 72 will therefore consist of a series of pulses for each wavelength change of the detected 4 mc. modulation signal. The output of the zero crossing detector 71 is fed to a digital computer 72, arranged to handle the programming and the computation necessary to resolve the range ambiguity. In the present invention, the ranging technique employed uses phase measurement on the 4 mc. modulation signal to obtain a high degree of fine range measurement. Since the 4 mc. modulation signal has a length of 123 feet, a range ambiguity is present at multiples of 123 feet that is resolved by phase tracking the modulation signal as its frequency is changed, for example, by 150 kc.

In considering the problem of providing unambiguous range information between objects moving relative to each other, it is important to remember that the relative movement will produce a relative Doppler shift on the carrier and subcarrier signals. The injected reference technique described in connection with the phase-locked receivers automatically cancels out this carrier phase shift in the carrier phase-locked loop, thereby allowing a phase measurement of the 4 mc. subcarrier signal relative to the carrier signal to provide range information from zero to 123 feet. The relative Doppler shift of the subcarrier signal caused by sweeping the 4 mc. modulation signal effects only the subcarrier signal and, hence, by counting the number of 4 mc. wavelengths within the sweeping period, it is possible to resolve the range ambiguity. At X-band, there are approximately 2460 cycles in a single 4 mc. wavelength, thereby providing a convenient means for monitoring the fine range by continuously counting and integrating the carrier Doppler signals every 123 feet or every 360 degree phase change of the subcarrier signal.

In the first embodiment described in connection with FIG. 3, the Doppler shift on the X-band signal is used directly as fine range in the range computation in connection with the digital computer 72. The X-band Doppler information is obtained by mixing the carrier injected reference signal from modulator 38 with the transmitted X-band signal from multiplier 32 in a mixer 73. In the preferred embodiment, the reference oscillator used in the radar system is 38 kc.; however, the reference oscillator used in the transponder is 32 kc. In addition, the transmitted carrier from the radar differs in frequency from the transmitted carrier from the transponder by appoximately 646 mc. The output of the mixer 73 will be a signal approximating the difference frequency of 646 mc., which is suitably filtered by a filter 74. The output of filter 74 is fed to another mixer 75 which mixes the signal with a portion of the carrier signal from multiplier 31 approxmating the difference frequency of 646 mc. to produce a bias frequency, for example, of 8 kc. The exact frequencies chosen are based primarily upon the frequency separation needed and desired between the radar carrier signal and the transponder carrier signal and the reference oscillator signals used in each system. The output signal of mixer 75 will be an 8 kc. signal that is suitably filtered by a filter 76 to pass the 8 kc. The output of filter 76 will consist of the X-band Doppler information on an 8 kc. bias frequency. By continuing monitoring the 8 kc. bias frequency, it is possible to detect an increase in the bias frequency which will indicate a closing range; whereas, a decrease of the 8 kc. bias frequency will indicate an opening range. The digital computer 72 continuously receives the bias frequency and X-band Doppler information from the filter 76 and, hence, is continually apprized as to whether the target transponder is opening or closing. The X-band Doppler count is used for fine ranging, and the increasing or decreasing bias frequency is used to control the direction of sweeping the VCO 33. The VCO 33 will sweep up in frequency by 150 kc. if the range is closing and down in frequency if the range is opening. The actual control of the VCO 33 is maintained by means of a sweep control 77 which generates the necessary varying voltages for controlling the frequency output of the VCO 33. The digital computer 72 controls the operation of the sweep control 77 to determine in which direction to sweep the frequency of the VCO 33. As shown by Equation 11, the accuracy of the coarse range determination will not be a function of the manner of sweeping the modulation frequency and will not be a function of any fixed phase error obtained in the 4 mc. signal. For example, the length of time it takes the VCO 33 to vary the 4 mc. modulation signal 150 kc. is unimportant to the coarse range ambiguity solution. In addition, the manner in which the sweeping progresses, i.e., whether the sweeping of the VCO 33 is linear or nonlinear, will also not affect the range ambiguity solution. In actual practice, the digital computer will count the number of zero crossings for a period of time before the sweep is initiated and after the sweep is terminated in an effort to average out random noise signals. The digital computer 72 completes the computation of Equation 11 solving for R, which represents the range between the radar station and the transponder. It will be appreciated that once the coarse range ambiguity is resolved that it is only necessary to continue measuring X-band Doppler count in order to update the information and continuously compare the zero crossing of the 4 mc. subcarrier signal from the zero crossing detector 71 with the proper number of X-band Doppler signals received from the filter 76 to continuously lock the fine range and the coarse range together.

Figure 4:
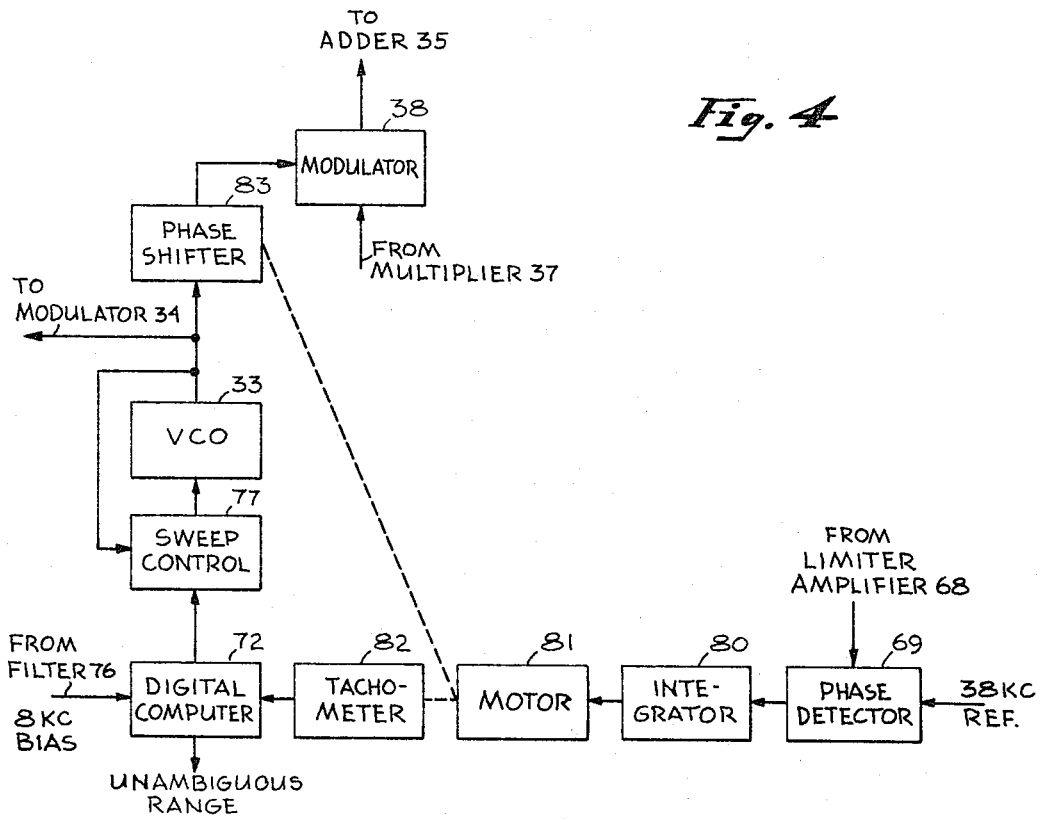
FIG. 4 is a partial block diagram used in conjunction with FIG. 3 and which illustrates a second embodiment of the invention for eliminating range ambiguity.

Referring now to FIG. 4, there is shown a second modification of the invention for resolving the range ambiguity at extreme ranges. The disclosed second embodiment is similar in operation to the first embodiment and is particularly useful for extended ranges between the radar station and the transponder. It will be appreciated that at extended ranges up to 100,000 miles the returned signal from the transponder will represent a substantial Doppler shift as related to the transmitted modulation signal. The substantially broadband amplifiers necessary to detect and amplify the original signal and the returned Doppler signal must of necessity also pass a large spectrum of noise, thereby reducing the signal-to-noise ratio of the loop amplifiers. The purpose of the second embodiment is to reduce the Doppler shift signal to a constant by conintuously tracking the received signal in a narrow band phase-locked loop circuit while continuously counting the subcarrier Doppler signal as a measure of the coarse range. The block diagram illustrated in FIG. 4 shows a preferred embodiment for use in connection with the basic figure of FIG. 1 for implementing the invention and is intended to replace parts of FIG. 1, where indicated. The output of the phase detector 69 is fed to an integrator 80, which is connected to and drives a motor 81. Since the integratiton of phase with time is frequency, the motor 81 will rotate at a speed determined by the subcarrier Doppler frequency. The output of the motor 81 mechanically drives a tachometer 82 and a mechanical phase shifter 83. Since the motor 81 is driven from the subcarrier phase-locked loop circuit, it can be shown that the rotation of the motor will be a function of the zero crossing or 360 degree phase changes of the 4 mc. detected subcarrier signal. An output signal for each revolution of the tachometer 82 is fed to the digital computer 72 since rotation of the tachometer indicates every 360 degrees one wavelength of the 4 mc. signal. As mentioned previously, the difference between the transmitted 4 mc. modulation signal and the received 4 mc. modulation signal will be the Doppler shift signal which determines the rotational speed of the motor 81. The digital computer 72 controls the operation of the sweep control 77, as previously described, which in turn generates the necessary voltages for causing the 150 kc. sweep of the 4 mc. modulation signal generated by the VCO 33. The output of the VCO 33 is also fed to the modulator 34 for modulating the transmitted signal and thereby generating the necessary 4 mc. subcarrier signal. The output of the VCO 33 is also fed to the modulator 38 for generating the subcarrier injected reference signal for the subcarrier loop; however, in this embodiment the modulation signal is first fed through a mechanical phase shifter 83, the output of which feeds the modulator 38. The phase shifter 83 modulates the subcarrier injected reference signal with the 4 mc. Doppler signal. Since at extreme ranges the Doppler signal is large, the purpose of the phase shifter 83 is to add to the injected reference signal a Doppler shift frequency signal detected by the subcarrier loop. In other words, the subcarrier loop in this embodiment will be a phase-locked loop generating a signal from the output of the phase detector 69 that will eventually control the motor 81 for generating a signal that is detected in the loop circuit to keep the phase error at zero. The amount of phase signal added to the injected reference signal needed to keep the error at zero is integrated into the Doppler frequency which is detected by means of the tachometer 82 that feeds computer 72. The effect is that the detected subcarrier signal is continuously tracked in the narrow band subcarrier phase-locked loop, for example, one cycle, without the necessity of the loop circuit having a wide bandwidth, for example, 100 cycles, to track a 100 cycle Doppler signal.

Figure 5:
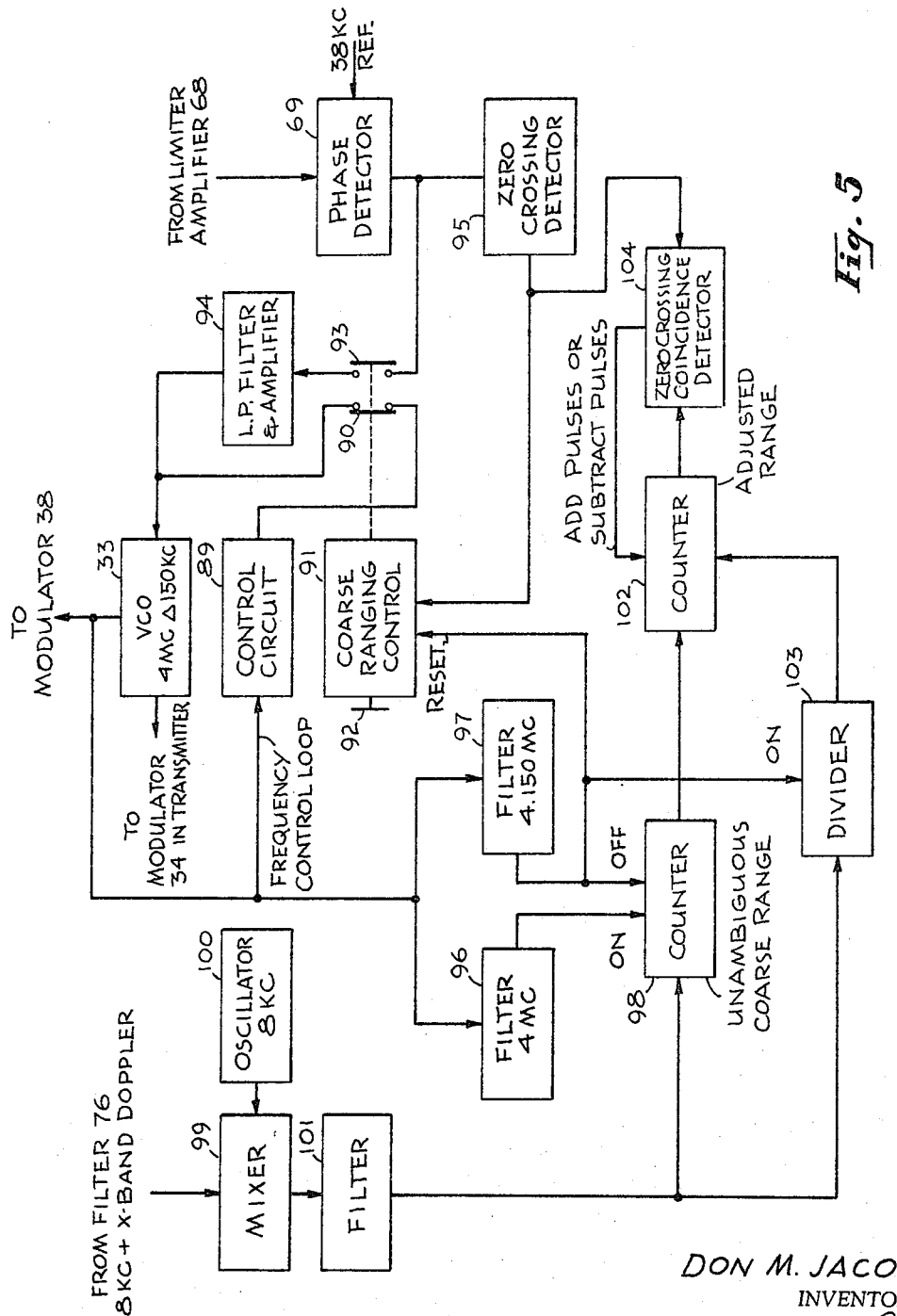
FIG. 5 is a partial block diagram used in conjunction with FIG. 3 and which illustrates a third embodiment of the invention for eliminating range ambiguity.

Referring now to FIG. 5, there is illustrated a third embodiment of the invention for providing a simplified range readout that allows simultaneous and independent readout and continuous range updating after the coarse range data has been obtained. The disclosed third embodiment consists primarily in counting the X-band Doppler signal minus the 8 kc. bias during the time the 4 mc. modulation frequency is swept between the two reference frequencies of 4 mc. and 4.15 mc. The modulation frequency is swept in such a way as to maintain the output of the coarse range phase detector at zero phase error during the sweep. In other words, the subcarrier loop is phase locked during the sweeping process only. This is accomplished by servoing the output error of the coarse range phase detector 69 to zero by sending the phase error signal through the appropriate integrators and stabilization networks for controlling the radar 4 mc. modulation signal in the VCO 33. The 4 mc. modulation signal frequency is started somewhat below 4 mc. and swept past the 4.15 mc. frequency. The reading on the output counter can be made to read the range exactly in feet or any other desirable unit as the 4 mc. passes through the 4.15 mc. frequency. The effect of phase locking the subcarrier signal on the varying 4 mc. modulation frequency is to automatically change the 4 mc. modulation frequency the same percentage in frequency as is obtained for the range variation obtained during the sweep.

The third embodiment of the invention is actually a simplification of embodiments one and two in that the need for a digital computer is eliminated. The simplification of the computation needed to solve the new ranging equation will be more apparent by referring again to Equation 11.

$$R_2 = C \left[ \frac{\Delta\phi_m - \Delta\phi_x \frac{F_1}{F_{xb}}}{4\pi[F_2 - F_1]} \right] \quad (11)$$

where $\Delta\phi_m$ = phase variation obtained on the 4 mc. round trip signal between the outgoing and returning 4 mc. modulation as seen at the output of the coarse range phase detector $\Delta\phi_x$ = phase variation in radians of the X-band signal— (round trip)

$F_1$ = frequency of first reference (4 mc.)
$F_2$ = frequency of second reference (4.15 mc.)
$F_{xb}$ = X-band frequency The value of $\Delta\phi_m$ is kept zero by changing the 4 mc. VCO modulating frequency in the radar unit. Hence, Equation 11 will then be reduced $$R_2 = \frac{-C\Delta\phi_x}{4\pi F_{xb}} \left\{ \frac{F_1}{[F_2 - F_1]} \right\} \quad (14)$$

$$\lambda_x = \frac{C}{F_{xb}}$$

as $$R_2 = \frac{-\lambda_x}{2} \frac{\Delta\phi_x}{2\pi} \frac{F_1}{F_2 - F_1} \quad (15)$$

as $$\frac{\Delta\phi_x}{2\pi}$$

= the number of X-band (round trip) Doppler cycles obtained during the 4 mc. sweep between 4 mc. to 4.15 mc.

$$R_2 = \frac{-\lambda_x}{2} \left\{ \begin{array}{l} \text{number of} \\ \text{X-band} \\ \text{cycles} \end{array} \right\} \frac{F_1}{F_2 - F_1} \quad (16)$$

$$\frac{F_1}{F_2 - F_1}$$

is a predetermined and known value and can be adjustable to make $R_2$ (as read on the counter) come out in feet. The implementation of the third embodiment is more fully described in connection with FIG. 5, which represents the additional circuitry which should be read in connection with the basic carrier loop circuits and transmitter circuits illustrated in FIG. 3.

Referring now to FIG. 5, there is shown a sweep control circuit 89 arranged to generate the necessary voltage for controlling the substantially constant frequency output of the 4 mc. modulation signal from the VCO 33. The output signal from the control circuit 89 passes through a first pair of normally closed contacting points 90. A coarse ranging control 91 is symbolic of the means either external to the radar or programed internally for initiating the sweeping operation needed to resolve the coarse range ambiguity. For example, the need for resolving coarse range ambiguity may be initiated by an operator that would simply depress a button 92 which would control suitable relays for operating contacting points 90. Under normal conditions the output of the phase detctor 69 continuously compares the phase of the substantially square wave 38 kc. signal fed from the limiter amplifier 68 in FIG. 3 with the 38 kc. signal generated by the reference oscillator 47. The output of the phase detector 69 is fed in a first path to a normally open contacting point 93, connected to a low pass filter and amplifier 94, which feeds the VCO 33. The contacting points 90 and 93 are both controlled by the coarse ranging control 91 upon initiation of coarse ranging. The second output path of the phase detector 69 feeds a zero crossing detector 95, such as a Schmidt trigger circuit, the output of which is fed to the coarse ranging control 91 for timing the initiation of the coarse ranging signal. The output from the zero crossing detector 95 insures that the coarse ranging control starts when the detected 4 mc. modulation signal passes through zero, which time is indicated by a pulse being generated by the zero crossing detector 95. The operation of the circuit will become more apparent by considering an example in which coarse ranging is initiated and the range ambiguity is to be resolved. As mentioned previously, the control for initiating the coarse ranging may be an operator depressing a button control 92 on the coarse ranging control 91 or the coarse ranging may be autocatically programmed within the coarse ranging control 91 upon receiving a signal from the zero crossing detector 95, since an output from the zero detector means that a target has been detected. The coarse ranging control 91 will be energized upon the next pulse received from the zero crossing detector 95, thereby insuring the contacting points 90 and 93 will be operated as the modulation signal passes through zero. When this event occurs normally closed contacting points 90 open and normally opened contacting points 93 close, thereby opening the circuit from the control circuit 89 to the VCO 33 and simultaneously directing the output of the phase detector 69 into the VCO 33 through the low pass filter and amplifier 94. The output of the phase detector 69 will, therefore, attempt to phase lock the detected 4 mc. subcarrier signal and generate an error signal that will vary the VCO 33 in frequency so as to null the error signal. The effect is that the frequency of the 4 mc. modulation signal from VCO 33 will vary as a function of the subcarrier Doppler shift. As illustrated in connection with FIG. 3, the output of the VCO 33 is fed to a modulator 34 in the transmitter for generating the subcarrier signal and also to a modulator 38 in receiver 22 for generating the subcarrier injected reference signal used to track the received 4 mc. subcarrier. The actual frequency generated by the VCO 33 is detected by means of a first 4 mc. filter 96 and a 4.150 mc. filter 97 which are both connected to the output of the VCO 33. The purpose of these filters is to supply the frequency of the first reference, $F_1$, and the frequency of the second reference, $F_2$, as set forth in connection with Equation 11. The output of the 4 mc. filter 96 is fed to a counter 98 and is used for turning the counter ON; whereas, the output of the 4.150 mc. filter 97 is also fed to counter 98 and is used for turning the counter OFF. Since the detected 4.150 mc. output from filter 97 indicates the upper limit of the sweep, the output signal is also fed to the coarse ranging control 91 as a reset pulse to stop the sweeping by allowing normally closed points 90 to close and normally opened points 93 to open.

The X-band Doppler information, as illustrated in FIG. 3, is generated as a modulation on the 8 kc. bias frequency. As mentioned previously, this 8 kc. bias frequency is a function of the carrier frequencies and the frequency separation between the transmitted carrier signals, together with the different offset reference frequencies of 38 kc. used in the radar and 32 kc. used in the transponder. In order to remove the 8 kc. bias frequency, the X-band Doppler information and bias frequency from filter 76 in FIG. 3 are fed to a mixer 99 illustrated in FIG. 5. Also feeding the mixer 99 is an 8 kc. signal generated by an oscillator 100. The output from the mixer 99 will, therefore, be the X-band Doppler frequency which is fed to a suitable low pass filter 101 for removing the unwanted higher frequencies. The output of filter 101 is therefore the X-band Doppler signal which is fed to the counter 98. The counter 98 will begin counting the X-band Doppler frequency when the VCO 33 passes through 4 mc. as detected by the filter 96. The counter 98 is turned OFF as soon as the modulation frequency generated by the VCO 33 passes through 4.150 mc. as detected by filter 97. The count in counter 98 is continuously transferred into another counter 102, which indicates an adjusted count that is continuous and unambiguous. The X-band Doppler count, in addition to being fed to counter 98, is also fed to a divider 103 which is gated ON by the output signal from the filter 97, which is the same signal used to turn counter 98 OFF. The counter 98 determines the initial coarse range determination from the X-band Doppler count during the sweeping process. The divider 103 is used to control a reversible counter 102 after the sweeping process when it can be shown that each Doppler pulse is equal to .05 feet and that 20 pulses equal one foot (with the appropriate choice of RF frequencies) to thereby update the unambiguous coarse range. The output of the counter 102 is the adjusted coarse range which feeds a zero crossing coincidence detector 104 which continuously compares the zero crossing of the adjusted range with the zero crossing of the fine range 4 mc. subcarrier signal from the phase detector 69. The coarse range may be accurate to 30 feet; whereas, the fine range is accurate to within one foot. The output of the counter 102 is, therefore, continuously compared with the fine range readout from the phase detector 69 to correct the reading in counter 102 to bring it back into synchronism with the fine range readout. This continuous updating of the coarse range by the fine range readout is easily understandable when it is considered that the X-band Doppler information counts must go through zero at the same time that the fine range readout goes through zero and, hence, it is therefore possible to control the accuracy of the coarse range by the fine range readout from the phase detector 69.

Figure 6:
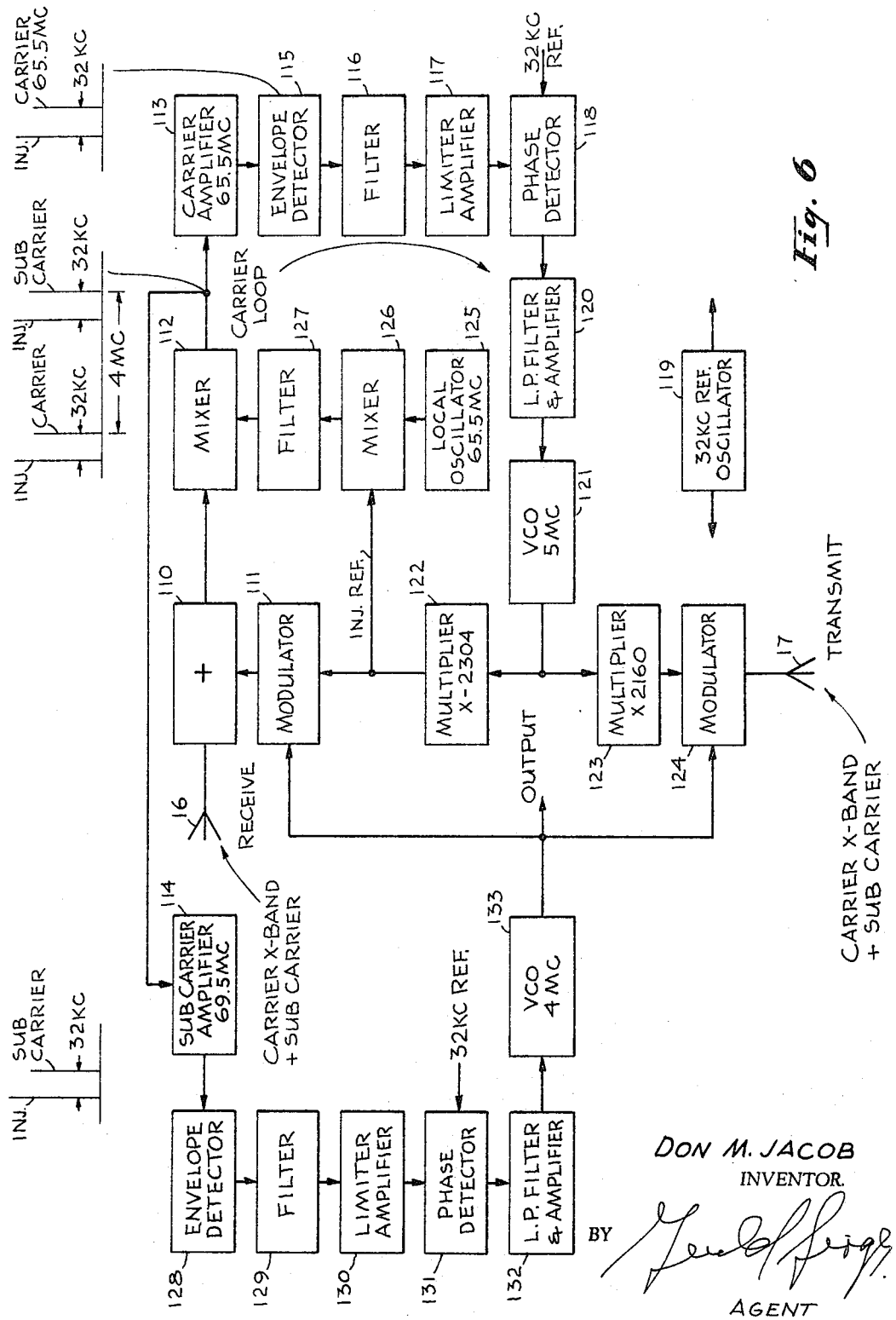
FIG. 6 is a block diagram of the transponder.

Referring now to FIG. 6, there is shown a block diagram illustrating the receiver and transmitter comprising the transponder. As mentioned previously, the intended purpose of the transponder is to receive the carrier and subcarrier signal from the radar and coherently transmit the carrier and subcarrier having the same phase relationship as received. Both the carrier signal and the subcarrier are received by antenna 16 and fed to an adder 110. In the transponder, the injected reference signal is selected to be 32 kc. lower than the received signals. The injected reference signal is fed to the adder 110 from a modulator 111. The output of the adder 110 feeds a mixer 112, which receives the X-band carrier signal and the carrier signal injected reference signal which is 32 kc. below the carrier frequency and the subcarrier signal, which is 4 mc. higher than the carrier signal with the subcarrier injected reference signal, which is 32 kc. below the received subcarrier signal. As mentioned in connection with the radar system, the local oscillator frequency is chosen to produce at zero Doppler a 65.5 mc. carrier and a 69.5 mc. subcarrier signal. The output of mixer 112 feeds a carrier amplifier 113 which is designed to pass 65.5 mc. and have a bandwidth of one mc., thereby effectively blocking the passage of the subcarrier signal. The output of the mixer 112 also feeds a subcarrier amplifier 114 designed to pass 69.5 mc. and have a bandwidth of one mc., thereby effectively blocking the passage of the subcarrier signal. The output of the mixer 112 also feeds a subcarrier amplifier 114 designed to pass 69.5 mc. and have a bandwidth of one mc., thereby effectively preventing the carrier signal from being passed.

The carrier amplifier 113 feeds an envelope detector 115 which detects the difference frequency of 32 kc. The 32 kc. signal is filtered in a filter 116 and fed to a limiter amplifier 117 for squaring off the 32 kc. signal at a constant amplitude. The output of the limiter amplifier 117, which is a square wave having a frequency of 32 kc., is fed to a phase detector 118, which compares the phase of the detected 32 kc. signal against a 32 kc. reference signal generated by a 32 kc. reference oscillator 119. A phase difference between the reference 32 kc. signal and the detected 32 kc. signal will result in the output of the phase detector 118, which feeds a low pass filter and amplifier 120. The low pass filter and amplifier 120 will produce a D.C. signal having sense and amplitude dependent on the phase difference between the detected 32 kc. signal and the reference 32 kc. signal as detected in the phase detector 118. The D.C. output from the low pass filter and amplifier 120 controls a VCO 121 having a frequency of approximately 5 mc. The 5 mc. output of the VCO 121 is multiplied approximately 2304 times in a multiplier 122, which is approximately the X-band carrier frequency less 32 kc. and represents the injected reference signal for the received carrier signal. The output of the multiplier 122 feeds the modulator 111, which receives a 4 mc. modulation signal for generating the subcarrier injected reference signal. The 5 mc. signal from the VCO 121 is also used as a basis for the transmitted carrier signal from the transponder after it is multiplied approximately 2160 times in a multiplier 123. The difference in multiplying factors of 2304 in multiplier 122 and 2160 in multiplier 123 will account for the approximate 646 mc. difference between the transmitted carrier signal from the radar and the transmitted carrier signal from the transponder. The output of the multiplier 123 is an X-band carrier signal that is transmitted from the antenna 17 after it has passed through a modulator 124. The technique for generating an X-band local oscillator signal for reducing the carrier frequency and subcarrier signal to 65.5 mc. and 69.5 mc., respectively, is achieved in a similar fashion as described for the radar. The 65.5 mc. signal is generated in a conventional solid-state local oscillator 125. The proper X-band frequency is achieved by mixing the 65.5 mc. signal from the local oscillator 125 with the X-band injected reference signal from the multiplier 122 in a mixer 126. It will be remembered that the output of the multiplier 122 is the injected reference signal which is offset on the lower side from the carrier signal by 32 kc. The output from the mixer 126 is filtered in a filter 127 to remove the higher frequencies. The output of filter 127 is mixed with the carrier and subcarrier and injected reference signals in the mixer 112 as previously described.

The output of the mixer 112 also includes a 69.5 mc. subcarrier with the subcarrier injected reference signal. The subcarrier amplifier 114 will pass only the 69.5 mc. subcarrier signal and its injected reference signal and discriminate against the 65.5 mc. carrier signal and its injected reference signal due to the one mc. bandpass of the amplifier. The output of the subcarrier amplifier 114 is fed to an envelope detector 128 for detecting the 32 kc. offset frequency. The detected signal is filtered in a filter 129 and fed to a limiter amplifier 130 for generating a square wave of substantially constant amplitude at the 32 kc. rate. The output of limiter amplifier 130 is fed to a phase detector 131. The phase detector 131 generates a signal based only on the phase difference between the detected 32 kc. and the reference 32 kc. signal from the oscillator 119 and feeds this error signal to a low pass filter and amplifier 132. The output of the low pass filter and amplifier 132 will be a D.C. signal varying in amplitude and sign as a function of the phase difference between the detected and the reference 32 kc. signals. The D.C. output of the low pass filter and amplifier 132 controls the frequency of the VCO 133. The 4 mc. signal from the VCO 133 modulates the carrier injected reference signal in the modulator 111 and also modulates the transmitted signal to produce the subcarrier signal that is 4 mc. removed from the carrier signal.

A review of the described circuits will show that the carrier loop has phase locked the received carrier signal with the transmitted carrier signal and that the defined subcarrier loop, which is phase locked to the received subcarrier signal by means of the offset injected reference of 32 kc., also modulates the transmitted signal with the same phase-locked 4 mc. signal. Since both the injected reference signal and the transmitted signal from the transponder are modulated with the same 4 mc. phase-locked signals from the VCO 133, it can now be seen that the transmitted subcarrier signal will be phase locked to the subcarrier signal. The transmitted frequency from the transponder is related to the received frequency by the following expression $$f_t = \frac{15}{16}(f_r - 0.032)$$

where $f_t$ and $f_r$ are the transmitted frequency and the received frequency of the transponder in mc. In the preferred embodiment for zero Doppler, $f_t$ is at 9699.969888 mc.; and the carrier frequency of the VCO 121 is at 4.4907268 mc. Phase coherency between the received carrier signal and the transmitted carrier signal is achieved by using the VCO 121 as the transmitted carrier signal and also as the injected reference signal.

Figure 7:
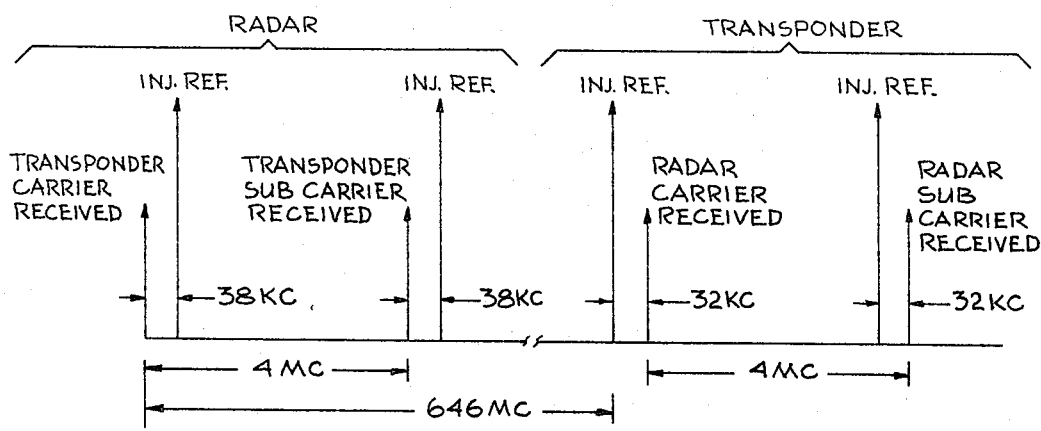
FIG. 7 illustrates the frequency spectrum of the transmitted, received and injected signals associated with the radar and the transponder.

Referring now to FIG. 7, there is shown a frequency spectrum fully illustrating the relationship of the carrier and subcarrier signals transmitted both by the radar and the transponder in the preferred embodiment. The exact frequency of the radar in the preferred embodiment was chosen to be 10,346.66575 mc., which was modulated by the 4 mc. signal to produce the radar subcarrier signal. The exact frequency is a function of the oscillator 30 in the transmitter of the radar. In the preferred embodiment, the frequency of the oscillator 30 was selected to be 4.4907407 mc., which was multiplied by multipliers 31 and 32 a factor of 2304 times, thereby resulting in a radar X-band carrier signal having a frequency of 10,346.66575 mc. plus a 4 mc. subcarrier. The injected reference signal in the transponder was generated so as to track the received radar carrier and the radar subcarrier signals on the low side with a separation of 32 kc., as illustrated. The carrier frequency transmitted by the transponder is a function of the frequency of the VCO 121 illustrated in FIG. 6. In the preferred embodiment, the frequency of the VCO 121 was chosen to be 4.4907268 mc., which was multiplied by a factor of 2160 in multiplier 123, thereby resulting in a carrier frequency of 9,699.969888 mc. and a 4 mc. subcarrier. The resultant frequency offset between the carrier frequency transmitted by the transponder and the carrier frequency transmitted by the radar is achieved by means of a difference in the multiplying factor of 2160 times in the multiplier 123 and the multiplying factor of 2304 times in multipliers 31 and 32. Since the carrier frequency in the transponder is basically generated by the VCO 121, which also generates the offset injected reference signal, it can be appreciated that the difference frequency of 646 mc. will represent the difference between the transmitted carrier signal from the transponder and the injected reference signal generated in the transponder. In the radar, the injected reference signal is generated 38 kc. on the high side of the received carrier and subcarrier signals.

Since the radar receiver tracks the received carrier, the X-band Doppler information appears in the receiver as the difference between the injected reference signal and the transmitted carrier signal. For the purpose of illustrating the method of Doppler extraction, system frequencies are tabulated below; and all frequencies are referenced to the difference frequency identified as $f_1 = 646.7$ mc.

TABLE I

*System frequencies for Doppler extraction method*

| | |
|---|---|
| Radar transmitter frequency | $16f_1$ |
| Transponder received frequency | $16f_1 - 16f_1 \dot{R}/c$ |
| Transponder injected reference | $16f_1 - 16f_1 \dot{R}/c - f_t$ |
| Transponder transmitter frequency | $15f_1 - 15f_1 \dot{R}/c - (15/16)f_t$ |
| Radar received frequency | $15f_1 - 15f_1 2\dot{R}/c - (15/16)f_t$ |
| Radar injected reference | $15f_1 - 15f_1 2\dot{R}/c - (15/16)f_t + f_r$ |

In the preceding table $f_t$ and $f_r$ are the transponder and radar reference offset frequencies, respectively. The difference between radar transmitter and injected reference frequencies is readily available from a suitable diode mixer on the terminated arm of a directional coupler. Placement of the diplexer in the receiver tracking loop assures sufficient transmitter power reflection into the terminated arm of the directional coupler and, in addition, provides the injected reference compensation for modulation phase errors introduced by the diplexer receive arm filter. The selected output frequency of the diode mixer is $$f_1 + 15 f_t \frac{2\dot{R}}{c} + \frac{15}{16} f_t - f_r$$

A further heterodyning with a signal of frequency $f_1$ obtained from the transmitter frequency multiplier chain followed by filtering to remove the 4 mc. subcarrier modulation (not shown in the expressions for frequency above) produces the X-band Doppler frequency on a bias frequency $f_r - (15/16)f_t$. The values $f_r = 38$ kc. and $f_t = 32$ kc. are chosen to yield a bias frequency of 8 kc.

In the preferred embodiment described, a completely solid-state transmitter and receiver have been described and illustrated. The multiplication factors mentioned have been achieved primarily by means of present-day varactor generators; and as a result, the exact carrier frequencies are a function of the multiples available. Receiver shielding requirements are minimized if the frequency is chosen to be above the intermediate frequency, thus removing the possibility of IF interference due to oscillator harmonics. However, investigation of the stability characteristics of various crystal oscillators disclosed that the requisite stability over a period of one month could be assured only for oscillators whose frequency is below 5 mc. Other factors influencing the choice of frequency are the required X-band transmit-receive offset and the restriction that in the interest of power efficiency frequency multiplication factors of two-three, and at most a single five be used in the varactor multiplier chains. In addition, it is considered desirable to obtain the necessary multiplier chain power amplification at a frequency in the 100–120 mc. range. It is desired that the X-band transmit-receive offset be large to ease microwave filter design requirements yet small enough to avoid modulation phase shifts on transmitted and received signals in the common broadband microwave elements. As a compromise between these factors, an X-band separation of approximately 646 mc. has been chosen. The transmitter multiplier chain may consist of a buffer amplifier following a crystal oscillator, a times 24 multiplication, with varactor stages, power amplification at 107.77778 mc. and X96 varactor chain. The choice of 9700 mc. for the low frequency in the coherent link is based on the desirability of avoiding the concentration of X-band radars in the X-band region immediately below that frequency.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. In combination,
    means for generating and transmitting CW carrier and subcarrier signals to a remote object, said subcarrier signal being generated by modulating said carrier signal with a modulation signal,
    means for receiving CW carrier and subcarrier signals from said object, said received signals having a fixed phase relation to said transmitted carrier and subcarrier signals,
    means for sweeping the frequency of said modulation signal in a given direction from a first frequency to a second frequency, and
    means for measuring the phase difference between the modulation on said transmitted signals and the modulation on said received signals due to the sweeping action for deriving range information.

2. In combination,
    means for generating and transmitting CW carrier and subcarrier signals to a remote object, said subcarrier signal being generated by modulating said carrier signal with a modulation signal,
    means for receiving CW carrier and subcarrier signals from said object, said received signals having a fixed phase relation to said transmitted carrier and subcarrier signals,
    means for sweeping the frequency of said modulation signal in a given direction from a first frequency to a second frequency,
    means for measuring the phase difference between the modulation on said transmitted signals and the modulation on said received signals due to the sweeping action,
    means for measuring the carrier Doppler frequency as a measure of the incremental range travelled by said object, and
    means for utilizing the carrier Doppler frequency with the phase difference to obtain unambiguous coarse range information to said object.

3. In combination,
    means for generating and transmitting CW carrier and subcarrier signals to a remote object, said subcarrier signal being generated by modulating said carrier signal with a modulation signal,
    means for receiving CW carrier and subcarrier signals having a fixed phase relation to said transmitted carrier and subcarrier signals,
    means for sweeping the frequency of said modulation signal in a given direction from a first frequency to a second frequency,
    means for measuring the phase difference between the modulation on said transmitted signals and the modulation on said received signals due to the sweeping action,
    means for measuring the carrier Doppler frequency as a measure of the incremental range travelled by said object,
    means for utilizing the carrier Doppler frequency with the phase difference to indicate unambiguous coarse range information to said object,
    means for measuring the zero crossings of said phase difference when not sweeping to indicate fine range, and
    means for adjusting said unambiguous coarse range information with said zero crossings to thereby improve the accuracy of said coarse range with said fine range.

4. In combination,
    means for generating and transmitting CW carrier and subcarrier signals to a remote object, said subcarrier signal being generated by modulating said carrier signal with a modulation signal,
    means for receiving CW carrier and subcarrier signals from said object, said received signals having a fixed phase relation to said transmitted carrier and subcarrier signals,
    means for sweeping the frequency of said modulation signal in a given direction from a first frequency to a second frequency,
    means for measuring the phase difference between the modulation on said transmitted signals and the modulation on said received signals during the time interval necessary to sweep from said first frequency to said second frequency,
    means for measuring the carrier Doppler frequency as a measure of the incremental range travelled by said object, and
    means for utilizing the carrier Doppler frequency with the phase difference to obtain unambiguous coarse range information to said object.

5. In combination,
    means for generating and transmitting CW carrier and subcarrier signals to a remote object, said subcarrier signal being generated by modulating said carrier signal with a modulation signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, means for measuring the phase difference between the modulation on said transmitted signals and the modulation on said received signals in response to said means passing said first frequency and said second frequency, means for measuring the carrier Doppler frequency as a measure of the incremental range travelled by said object, and means for utilizing the carrier Doppler frequency with the phase difference to obtain unambiguous coarse range information to said object.

6. In a phase-locked radar system using a CW carrier signal that is modulated by a modulation signal to generate a subcarrier signal in which the differential phase changes between the modulation on the transmitted signals and the modulation on the received signals are indicative of ambiguous range, the improvement comprising means for varying the modulation frequency in a given direction from a first frequency to a second frequency, means for comparing the received carrier signal with the transmitted carrier signal during the sweeping action to obtain a carrier Doppler signal, and means for adjusting the number of wavelengths of said differential phase change with said carrier Doppler signal to obtain unambiguous range information.

7. In a phase-locked radar system using a CW carrier signal that is modulated by a modulation signal to generate a subcarrier signal in which the differential phase changes between the modulation on the transmitted signals and the modulation on the received signals are indicative of ambiguous range, the improvement comprising means for varying the modulation frequency in a given direction from a first frequency to a second frequency, means for comparing the received carrier signal with the transmitted carrier signal during the sweeping action to obtain a carrier Doppler signal, means for adjusting the number of wavelengths of said differential phase change with said carrier Doppler signal to obtain unambiguous range information, means for measuring the zero crossings of said phase difference when not sweeping to indicate fine range, means for adjusting said unambiguous coarse range information with said zero crossings to thereby improve the accuracy of said coarse range with said fine range, and means for combining incremental range data from said carrier Doppler frequency with said unambiguous coarse range information to said object.

8. In a phase-locked radar system using a carrier signal that is modulated by a modulation signal to generate a carrier signal and a subcarrier signal in which the differential phase changes between the modulation on the transmitted signals and the modulation on the received signal are indicative of ambiguous range, the improvement comprising means for varying the modulation frequency in a given direction from a first frequency to a second frequency, means for comparing the phase of the transmitted carrier signal with the received carrier signal to obtain a carrier Doppler signal indicative of incremental range change, means for counting the differential number of modulation wavelengths between said transmitted signals and said received signals during the time interval that said sweeping means is varying said modulation signal from said first frequency to said second frequency to thereby obtain a count of the ambiguous range, and means for combining said count of the ambiguous range with said incremental range change information to provide a count of unambiguous range.

9. In a phase-locked radar system using a carrier signal that is modulated by a modulation signal to generate a carrier signal and a subcarrier signal in which the differential phase changes between the modulation on the transmitted signals and the modulation on the received signal are indicative of ambiguous range, the improvement comprising means for varying the modulation frequency in a given direction from a first frequency to a second frequency, means for comparing the phase of the transmitted carrier signal with the received carrier signal to obtain a carrier Doppler signal indicative of incremental range change, means for counting the differential number of modulation wavelengths between said transmitted signals and said received signals during the time interval that said sweeping means is varying said modulation signal from said first frequency to said second frequency to thereby obtain a count of the ambiguous range, means for combining said count of the ambiguous range with said incremental range change information to provide a count of unambiguous range, means for measuring the zero crossings of said modulation difference wavelengths when not sweeping to indicate fine range, and means for adjusting said unambiguous range information with said zero crossings to thereby improve the accuracy of said unambiguous range.

10. In a phase-locked radar system using a carrier signal that is modulated by a modulation signal to generate a carrier signal and a subcarrier signal in which the differential phase changes between the modulation on the transmitted signals and the modulation on the received signal are indicative of ambiguous range, the improvement comprising means for varying the modulation frequency in a given direction from a first frequency to a second frequency, means for comparing the phase of the transmitted-carrier signal with the received carrier signal to obtain a carrier Doppler signal indicative of incremental range change, means for counting the differential number of modulation wavelengths between said transmitted signals and said received signals during the time interval that said sweeping means is varying said modulation signal from said first frequency to said second frequency to thereby obtain a count of the ambiguous range, means for combining said count of the ambiguous range with said incremental range change information to provide a count of unambiguous range, means for measuring the zero crossings of said modulation difference wavelengths when not sweeping to indicate fine range, means for adjusting said unambiguous range information with said zero crossings to thereby improve the accuracy of said unambiguous range, and means for combining incremental range from said carrier Doppler frequency with said unambiguous range information to obtain updated range information to said object.

11. In combination, means for generating and transmitting CW carrier and subcarrier signals to a remote object, said subcarrier signal being generated by modulating said carrier signal with a modulation signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, carrier loop tracking means phase locked on said received carrier signal for tracking said received carrier signal by keeping the phase error in said loop substantially zero, subcarrier loop tracking means for tracking said received subcarrier signal relative to said phase-tracked carrier signal and generating an error signal indicating the modulation difference between the modulation on said transmitted signals and the modulation on said received signals, means for measuring the error signal due to the sweeping action, means for measuring the carrier Doppler frequency as a measure of incremental range travelled by said object, and means for utilizing the carrier Doppler frequency with error signal to obtain unambiguous coarse range to said object.

12. In combination, means for generating and transmitting CW carrier and subcarrier signals to a remote object, said subcarrier signal being generated by modulating said carrier signal with a modulating signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, carrier loop tracking means phase locked on said received carrier signal for tracking said received carrier signal by keeping the phase error in said loop substantially zero, subcarrier loop tracking means for tracking said received subcarrier signal relative to said phase-tracked carrier signal and generating an error signal indicating the modulation difference between the modulation on said transmitted signals and the modulation on said received signals, means for measuring the error signal due to the sweeping action, means for measuring the carrier Doppler frequency as a measure of incremental range travelled by said object, means for utilizing the carrier Doppler frequency with the error signal to obtain unambiguous coarse range to said object, means for measuring the zero crossings of said error signal when not sweeping to indicate fine range, and means for adjusting said unambiguous range with said zero crossings to thereby improve the accuracy of said unambiguous range with said fine range.

13. In combination, means for generating and transmitting CW carrier signals to a remote object, said subcarrier signal being generated by modulating said carrier signal with a modulation signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, carrier loop tracking means phase locked on said received carrier signal for tracking said received carrier signal by keeping the phase error in said loop substantially zero, subcarrier loop tracking means for tracking said received subcarrier signal relative to said phase-tracked carrier signal and generating an error signal indicating the modulation difference between the modulation on said transmitted signals and the modulation on said received signals, means for sweeping the frequency of said modulation signal with said error signal in a direction for maintaining said error signal in a direction for maintaining said error signal substantially zero, means for measuring the carrier Doppler frequency as a measure of incremental range travelled by said object, and means responsive to said modulation frequency during the sweeping action for counting said carrier Doppler frequency as a measure of the unambiguous range to said object.

14. In combination, means for generating and transmitting CW carrier signals to a remote object, said subcarrier signal being generated by modulating said carrier signal with a modulation signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, carrier loop tracking means phase locked on said received carrier signal for tracking said received carrier signal by keeping the phase error in said loop substantially zero, subcarrier loop tracking means for tracking said received subcarrier signal relative to said phase-tracked carrier signal and generating an error signal indicating the modulation difference between the modulation on said transmitted signals and the modulation on said received signals, means for sweeping the frequency of said modulation signal with said error signal in a direction for maintaining said error signal in a direction for maintaining said error signal substantially zero, means for measuring the carrier Dopper frequency as a measure of incremental range travelled by said object, means responsive to said modulation frequency during the sweeping action for counting said carrier Doppler frequency as a measure of the unambiguous range to said object, means for measuring the zero crossings of said modulation difference frequency when not sweeping to indicate fine range, and means for adjusting said unambiguous coarse range information with said zero crossings to thereby improve the accuracy of said coarse range with said fine range.

15. In combination, means for generating and transmitting CW carrier and subcarrier signals to a remote object, said subcarrier signal being generated by modulating said carrier signal with a modulation signal, means for receiving CW carrier and subcarrier signals from said object, said received signals having a fixed phase relation to said transmitted carrier and subcarrier signals, means for sweeping the frequency of said modulation signal in a given direction from a first frequency to a second frequency, loop means for measuring the modulation difference frequency between the modulation on said transmitted signals and the modulation on said received signals due to the sweeping action, means for measuring the carrier Doppler frequency as a measure of the incremental range travelled by said object, means for integrating the modulation difference frequency during the sweeping of said transmitted modulation signal, a motor mechanically driving a signal generator and a phase shifter, said motor being controlled by the output of said integrator whereby said motor rotates at a speed determined by the modulation difference frequency, means for utilizing the carrier Doppler frequency with the output signal from said signal generator during the sweeping period to obtain unambiguous coarse range information to said object, means for measuring the zero crossings of said modulation difference frequency when not sweeping to indicate fine range, means for adjusting said unambiguous coarse range information with said zero crossings to thereby improve the accuracy of said coarse range with said fine range, and means for combining incremental range data from said carrier Doppler frequency with said unambiguous coarse range information to obtain updated range information to said object.

16. In a phase-locked radar system using a CW carrier signal that is modulated by modulation to generate a subcarrier signal in which the differential phase changes between the modulation on the transmitted signals and the modulation on the received signals are indicative of ambiguous range to a remote object, the method of resolving the range ambiquity that comprises the steps of:

first varying the modulation frequency in a given direction from a first frequency to a second frequency, then measuring the modulation difference frequency between the modulation on said transmitted signals and the modulation on said received signals due to the sweeping action, then measuring the carrier Doppler frequency to indicate the incremental range travelled by the object during the sweeping process, and then adjusting modulation frequency with the Doppler frequency to indicate unambiguous range.

17. In a phase-locked radar system using a CW carrier signal that is modulated by modulation to generate a subcarrier signal in which the differential phase changes between the modulation on the transmitted signals and the modulation on the received signals are indicative of ambiguous range to a remote object, the method of resolving the range ambiguity that comprises the steps of:

first varying the modulation frequency in a given direction from a first frequency to a second frequency, then measuring the modulation difference frequency between the modulation on said transmitted signals and the modulation on said received signals due to the sweeping action, then measuring the carrier Doppler frequency to indicate the incremental range travelled by the object during the sweeping process, then adjusting modulation frequency with the Doppler frequency to indicate unambiguous range, then measuring the zero crossings of the modulation difference frequency when not sweeping to indicate fine range, and then adjusting the unambiguous coarse range information with the zero crossings to thereby improve the accuracy of the coarse range with the fine range.

18. In a phase-locked radar system using a CW carrier signal that is modulated by modulation to generate a subcarrier signal in which the differential phase changes between the modulation on the transmitted signals and the modulation on the received signals are indicative of ambiguous range to a remote object, the method of resolving the range ambiguity that comprises the steps of:

first varying the modulation frequency in a given direction from a first frequency to a second frequency, then measuring the modulation difference frequency between the modulation on said transmitted signals and the modulation on said received signals due to the sweeping action, then measuring the carrier Doppler frequency to indicate the incremental range travelled by the object during the sweeping process, then adjusting modulation frequency with the Doppler frequency to indicate unambiguous range, then measuring the zero crossings of the modulation difference frequency when not sweeping to indicate fine range, then adjusting the unambiguous coarse range information with the zero crossings to thereby improve the accuracy of the coarse range with the fine range, and then combining incremental range data from the carrier Doppler frequency with the unambiguous coarse range information to obtain updated range information to said object.

References Cited by the Examiner

UNITED STATES PATENTS

| | | | |
|---|---|---|---|
| 2,451,822 | 10/1948 | Guanella | 343—14 |
| 2,556,109 | 6/1951 | Rust et al. | 343—14 |
| 2,966,676 | 12/1960 | Fox | 343—14 |
| 2,978,698 | 4/1961 | Schultz et al. | 343—9 |
| 3,054,104 | 9/1962 | Wright et al. | 343—14 |
| 3,114,147 | 12/1963 | Kuecken | 343—9 |

CHESTER L. JUSTUS, *Primary Examiner.*

R. E. KLEIN, R. D. BENNETT, *Assistant Examiners.*